(12) United States Patent
Ahmad et al.

(10) Patent No.: US 9,188,015 B2
(45) Date of Patent: Nov. 17, 2015

(54) ELONGATE COMPONENT HAVING LONGITUDINAL GRAINS WITH DIFFERENT WIDTHS

(75) Inventors: Fathi Ahmad, Kaarst (DE); Stefan Krause, Krefeld (DE); Oliver Lüsebrink, Witten (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1778 days.

(21) Appl. No.: 12/437,075

(22) Filed: May 7, 2009

(65) Prior Publication Data

US 2009/0280291 A1  Nov. 12, 2009

(30) Foreign Application Priority Data

May 9, 2008  (EP) .................................... 08008783

(51) Int. Cl.
| | |
|---|---|
| *B32B 5/12* | (2006.01) |
| *F01D 5/28* | (2006.01) |
| *B22D 27/04* | (2006.01) |
| *C22C 19/05* | (2006.01) |
| *C22F 1/10* | (2006.01) |

(52) U.S. Cl.
CPC .............. *F01D 5/286* (2013.01); *B22D 27/045* (2013.01); *C22C 19/05* (2013.01); *C22F 1/10* (2013.01); *F05D 2240/121* (2013.01); *F05D 2240/303* (2013.01); *F05D 2300/606* (2013.01); *Y02T 50/67* (2013.01); *Y10T 428/24074* (2015.01)

(58) Field of Classification Search
USPC .......................................... 148/433; 428/107
See application file for complete search history.

(56) References Cited

U.S. PATENT DOCUMENTS

| | | | | |
|---|---|---|---|---|
| 4,342,542 | A | * 8/1982 | Tan et al. | 416/224 |
| 4,934,446 | A | * 6/1990 | Winter | 164/503 |
| 5,611,670 | A | * 3/1997 | Yoshinari et al. | 416/241 R |
| 6,024,792 | A | 2/2000 | Bieler | |
| 2009/0123290 | A1* | 5/2009 | Imano et al. | 416/241 R |

FOREIGN PATENT DOCUMENTS

| | | |
|---|---|---|
| CA | 838482 A | 4/1970 |
| EP | 0066971 A2 | 12/1982 |
| EP | 0413439 A1 | 2/1991 |
| EP | 486489 B1 | 11/1994 |
| EP | 412397 B1 | 3/1998 |
| EP | 892090 A1 | 1/1999 |
| EP | 786017 B1 | 3/1999 |
| EP | 1306454 | 5/2003 |
| EP | 1319729 A1 | 6/2003 |
| EP | 1204776 B1 | 6/2004 |
| GB | 2030233 A | 4/1980 |
| WO | WO 9967435 A1 | 12/1999 |
| WO | WO 0044949 A1 | 8/2000 |

* cited by examiner

Primary Examiner — Rebecca Lee

(57) ABSTRACT

A component, designed so that the longitudinal grain which experiences the greatest stress has a larger grain width than the other grains, is provided. This longitudinal grain is usually on the edge of the component. The component includes longitudinal grains that are directionally solidified in a rod-crystalline form along the longitudinal axis of the component.

20 Claims, 6 Drawing Sheets

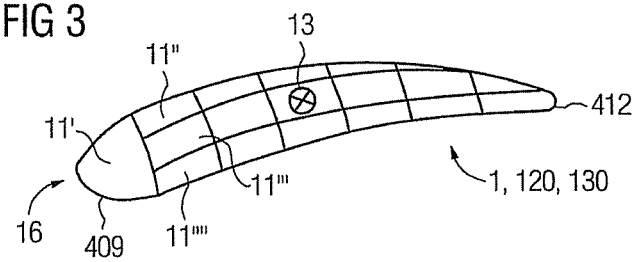
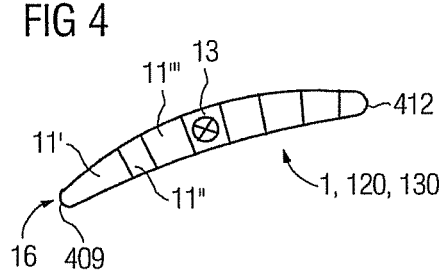
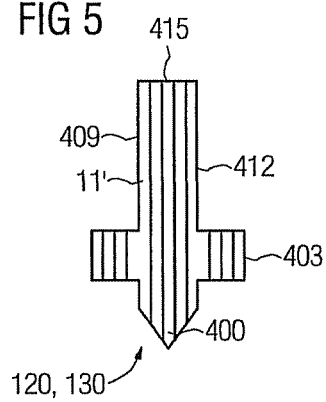
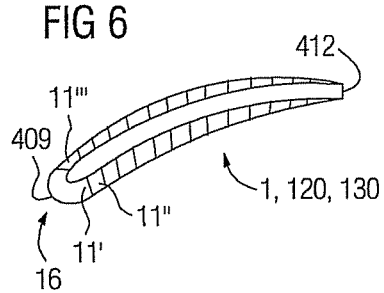
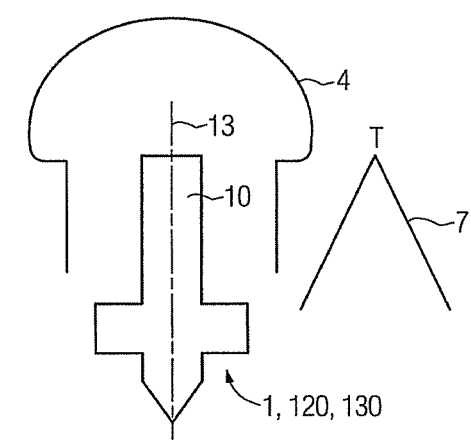

FIG 11

| Material | chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based fine cast alloys | | | | | | | | | | | | | |
| IN 6203 DS | 0.15 | 22.0 | remainder | 19.0 | | 2.0 | 1.1 | 0.8 | 2.3 | 3.5 | 0.010 | 0.10 | 0.75 |
| GTD 111 DS | 0.10 | 14.0 | remainder | 9.5 | 1.5 | 3.8 | 2.8 | | 3.0 | 4.9 | 0.012 | 0.03 | |
| IN 792 DS | 0.08 | 12.5 | remainder | 9.0 | 1.9 | 4.1 | 4.1 | | 3.4 | 3.8 | 0.015 | 0.02 | 1.00 |
| MAR M 247 LC DS | 0.07 | 8.1 | remainder | 9.2 | 0.5 | 9.5 | 3.2 | | 5.6 | 0.7 | 0.015 | 0.02 | 1.40 |

ELONGATE COMPONENT HAVING LONGITUDINAL GRAINS WITH DIFFERENT WIDTHS

CROSS REFERENCE TO RELATED APPLICATIONS

This application claims priority of European Patent Office application No. 08008783.6 EP filed May 9, 2008, which is incorporated by reference herein in its entirety.

FIELD OF INVENTION

The invention relates to an elongate component according to the claims.

BACKGROUND OF INVENTION

Many components for use in the high-temperature range have a single-crystal (SX) structure or one which is solidified in a columnar form (DS).

This leads to further increase in the mechanical strength compared with a nondirectionally solidified component (CC).

Column-solidified components are more economical to produce than single-crystal components.

However, these directionally solidified components have disadvantages in terms of mechanical strength compared with single-crystal components.

SUMMARY OF INVENTION

It is therefore an object to overcome the problem described above.

The object is achieved by a component as claimed in the claims.

The dependent claims list further advantageous measures, which may be combined with one another in any desired way in order to achieve further advantages.

BRIEF DESCRIPTION OF THE DRAWINGS

FIGS. 1 to 6 show various views of a component,
FIG. 7 shows a method for producing a component,
FIG. 10 shows a combustion chamber in perspective and
FIG. 11 shows a list of DS superalloys.

DETAILED DESCRIPTION OF INVENTION

The figures and the description merely represent exemplary embodiments of the invention.

Figure 1:
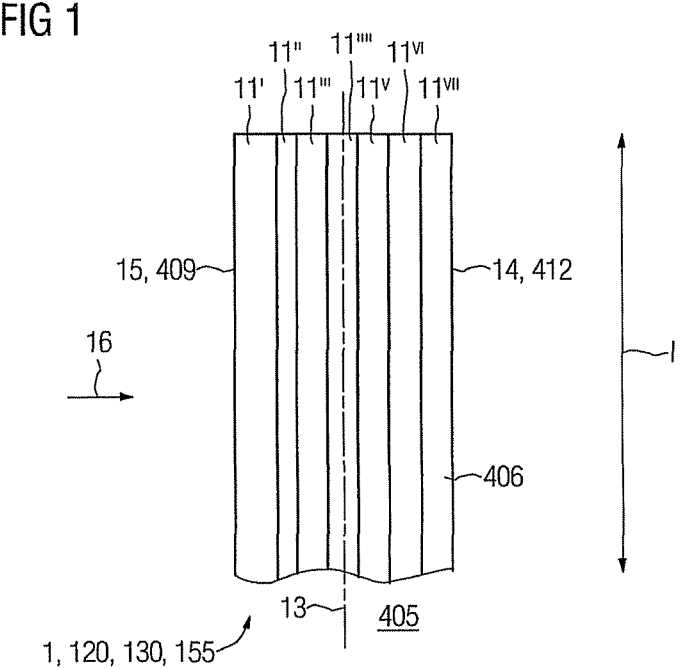

FIG. 1 shows an elongate component 1, 120, 130, 155 by way of example.

The elongate component 1, 120, 130, 155 has a longitudinal axis 13, 1, along which it extends.

Figure 2:
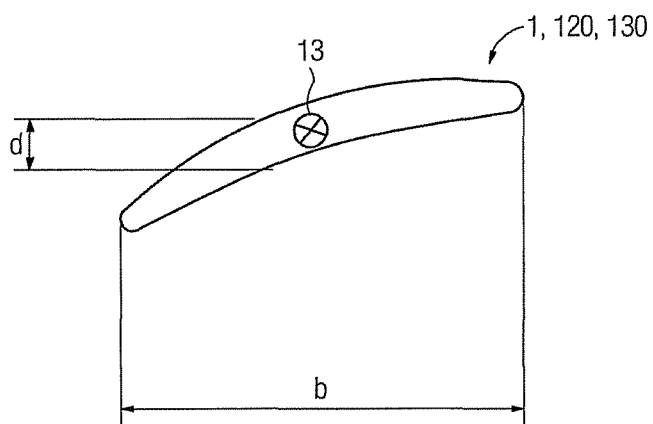
Figure 8:
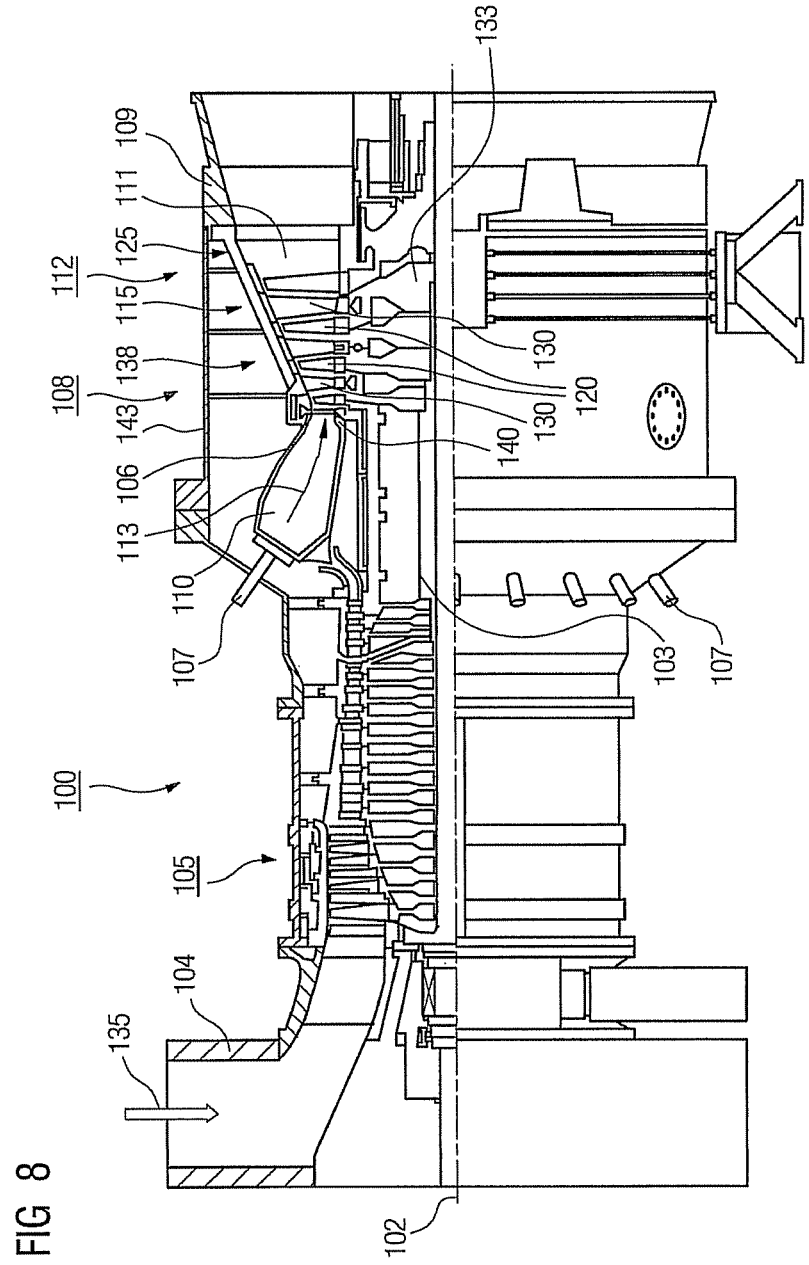
FIG. 8 shows a gas turbine.
Figure 9:
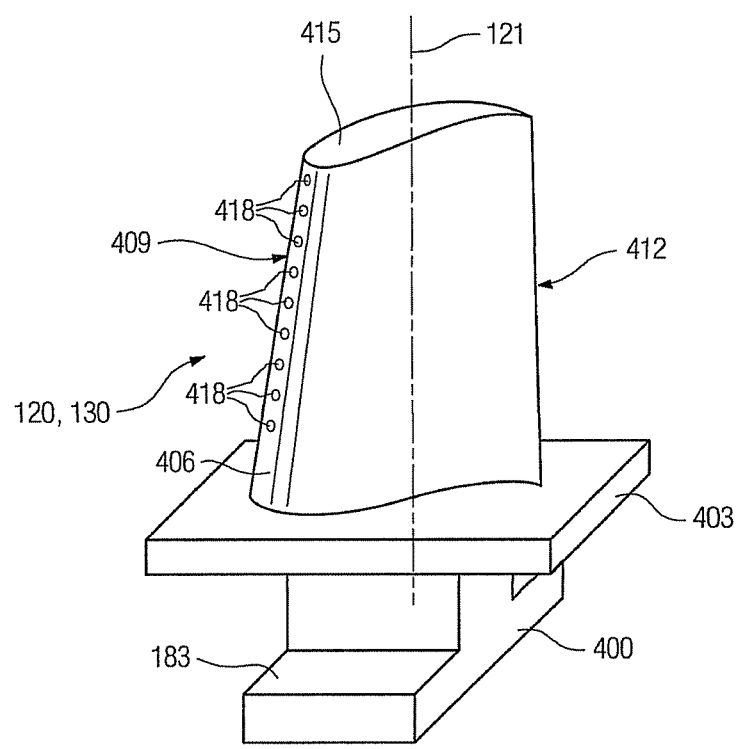
FIG. 9 shows a turbine blade in perspective.

The width b of the component 1, 120, 130, 155 is a dimension perpendicular to the longitudinal axis 13 (FIG. 2). The width b may also be the chord length of a turbine blade 120, 130 (FIGS. 8, 9).

Preferably, the elongate component 1 is a turbine blade 120, 130 around which a medium flows in the circulation direction, which extends perpendicularly to the longitudinal axis 13.

The invention will be explained, merely by way of example, with reference to a turbine blade 120, 130.

The width b of the turbine blade 120, 130 is in this case the dimension in the flow direction 16 of a medium, which flows around the turbine blade 1, 120, 130 (FIG. 3).

The thickness d of the turbine blade 120, 130 extends perpendicularly to the flow direction 16, i.e. perpendicularly to the width b and the length l.

Figure 10:
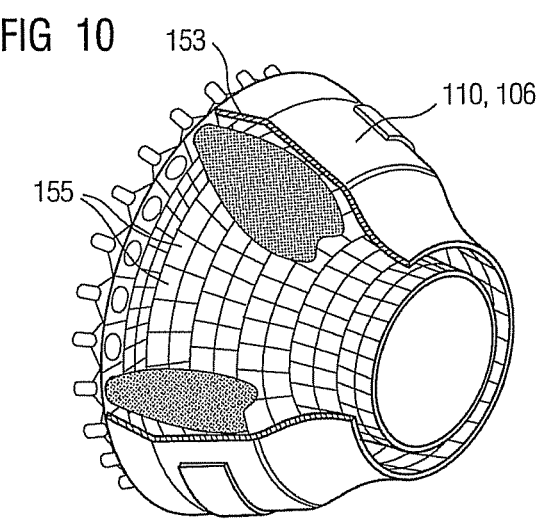

The length l is intended to mean the length of longitudinal grains 11', 11", which need not necessarily be the length of the component 1, 120, 130, 155 (FIGS. 8, 9, 10). Preferably, the length l is the length of the elongate component 1, 120, 130, 155.

Elongate means a length/width ratio l/b>3 or a length/thickness ratio l/d of at least 5, in particular 10.

The elongate component 1, 120, 130, 155 has longitudinal grains 11', 11", . . . along the longitudinal axis 13, and more particularly from 1 to 90%, in particular 100%, of the component consists of longitudinal grains 11', 11", . . . .

A longitudinal grain 11', 11", . . . is essentially a single crystal.

The elongate component 1, 120, 130, 155 is produced by a casting method, so that the longitudinal grains 11', 11", . . . are joined together by grain boundaries.

The elongate component 1 has a leading edge 15, 409 and a trailing edge 14, 412.

In the case of the turbine blade 120, 130, at least one turbine blade surface 406 (FIG. 8) has the columnar grains 11', 11", 11''', . . . . In this case, the aforementioned length/width ratios or length/thickness ratios then preferably refer only to the turbine blade surface 406.

The turbine blades 120, 130 have a plurality of column-solidified longitudinal grains 11', 11", . . . , which extend along the longitudinal axis 13.

Preferably, the elongate component 1, 120, 130, 155 has at least three, in particular six and more particularly twelve longitudinal grains 11', 11", . . . .

There are preferably at most 60 longitudinal grains 11', 11", 11''', . . . , more particularly at most 50 longitudinal grains 11', 11", . . . .

The longitudinal grains 11', 11", . . . have different grain widths transverse to the longitudinal axis 13. Some longitudinal grains 11', 11", 11''', 11'''' may be equally wide.

Preferably, the first longitudinal grain 11' to receive a medium on an edge 15, 409 has the largest grain width a' or the largest grain cross section. The subsequent grains 11", 11''', . . . , do not have a larger width a', a", . . . , although some of them at most may also be equally wide.

In this case, preferably at most half the longitudinal grains 11", 11''', . . . are equally wide as the first longitudinal grain 11'.

Preferably, the rest of the longitudinal grains 11", 11''' are smaller in terms of grain width.

An "edge" may also mean a front side of an elongate component 1 or a turbine blade 120, 130.

The term "grain width" may also mean the cross-sectional area of a longitudinal grain 11', 11". A maximum grain width then correspondingly refers to a maximum cross-sectional area of the grain.

Preferably, the first longitudinal grain 11' has a grain width a' of from 5 mm to 60 mm.

The other longitudinal grains 11", 11''', . . . may be formed wider than the first longitudinal grain 11'.

There will therefore be no grain boundaries in the region of the component's greatest mechanical stress.

The turbine blade 120, 130 preferably has a width b (along a flow direction) of from 70 mm to 300 mm.

The turbine blade 120, 130 preferably has a length of from 100 mm ($1^{st}$ stage) to 500 mm ($3^{rd}$ stage).

According to the invention, the grain width a' of the first longitudinal grain 11' on an edge 15, 409 of the component 1, 120, 130, 155 is at least 20% of the width b of the component 1, 120, 130, 155. Other longitudinal grains 11", 11'", ... may be equally wide or wider.

As a special case, the first grain 11' of a component 1, 120, 130 is configured to be wider than the others, the width/thickness ratio b/d (aspect ratio) being more than 2, in particular more than 5.

Preferably, the entire blade surface 406 has longitudinal grains 11', 11", .... Furthermore, the longitudinal grains 11', 11", ... preferably extend at least into the blade platform 403, and in particular over the blade platform 403 or beyond it (FIG. 5).

In particular, a wide grain 11' is arranged at the junction between the blade surface 406 and the blade platform 403.

The number of longitudinal grains 11', 11", ... is preferably greatest at the blade tip 415, and may then decrease (not shown) toward the fastening region 400 since some longitudinal grains 11', 11", ... grow at the cost of others.

The blade root 400 may have differently oriented grains. The length l is then in this case the length of the blade surface 406. The dimension of the fastening region 400 in the longitudinal direction 13 is then further added to the length of the turbine blade 120, 130.

Preferably, the fastening region 400 also only has longitudinal grains 11', 11", ..., i.e. l=total length of the turbine blade 120, 130.

The turbine blade 120, 130 preferably comprises a DS superalloy according to FIG. 11, but also CM 247 LC DS and preferably an alloy comprising (in wt %)
11.94% Cr
4.03% Ti
1.84% Mo
3.75% W
5.15% Ta
3.55% Al
8.93% Co
0.008% B
0.02% Zr
0.06% C
0.01% Hf
remainder nickel
with tantalum carbide (0.4 vol % to 1.5 vol %) as a secondary phase, or preferably comprising:
Cr 11.60 to 12.70%
Ti 3.90 to 4.25%
Mo 1.65 to 2.15%
W 3.50 to 4.10%
Ta 4.80 to 5.20%
Al 3.40 to 3.80%
Co 8.50 to 9.50%
B 0.0125 to 0.0175%
C 0.08 to 0.10%
Ni remainder.

FIG. 3 shows the longitudinal grains 11', 11", ... as shown in FIG. 2 in cross section.

The longitudinal grains 11', 11", ... may be arranged next to one another or behind one another in the flow direction 16.

In FIG. 4, the longitudinal grains 11', 11", ... are arranged behind one another in the flow direction 16.

The same respectively applies for a wall of a turbine blade 120, 130 or of a hollow component (FIG. 6).

Preferably, the edge 15, 409, i.e. essentially the front side of the component 120, 130, will be formed only by this longitudinal grain 11'.

Preferably, the component 1 is a turbine blade 120, 130 while having individual or combined properties from the following list: the turbine blade has
- at least three, in particular at least six, more particularly at least twelve longitudinal grains (11', 11", ... ),
- a longitudinal grain (11') on the edge (15, 409) perpendicular to the longitudinal axis (13), which has a grain width of from 5 mm to 60 mm, more particularly from 10 mm to 60 mm, more particularly from 5 mm to 40 mm,
- perpendicular to the longitudinal axis (13) a width (b) of from 70 mm to 300 mm, in particular from 100 mm to 250 mm,
- a length (l) and a width (b), in particular of the blade surface 406, the length/width ratio (l/b) being >3,
- a length (l) and a thickness (d), in particular of the blade surface 406, the length/thickness ratio (l/d) being >5, in particular >10,
- a longitudinal grain (11'), around which a medium flows in a flow direction (16) at an angle not equal to 0°, in particular perpendicularly to the longitudinal axis (1, 13), the longitudinal grain (11') which is widest or has the largest cross section representing the longitudinal grain (11') receiving the flow first,
- a width (b) and a thickness (d), in particular of the blade surface 406, the width/thickness ratio (b/d) being >2, in particular >5, more particularly >10,
- at most 50 longitudinal grains (11', 11", ... ),
- a longitudinal grain (11') which has a minimum grain width of 5 mm,
- at least 90% longitudinal grains (11', 11", ... ) produced by casting,
- the grain width of the longitudinal grain (11') on the edge (15, 409) which is at most 50% of the width (b) of the component (1, 120, 130, 155),
- a grain width of the longitudinal grain (11') on an edge (15, 409) which is at least 20% of the width (b) of the component (1, 120, 130, 155),
- a blade surface, wherein the longitudinal grains (11', 11", ... ) extend at least over the entire blade surface (406),
- a blade platform (403), wherein the longitudinal grains (11', 11", ... ) extend at least partially into a blade platform (403), in particular at least beyond the blade platform (403),
- a blade root (406), which has a width (b) perpendicularly to the longitudinal axis (13) of from 70 mm to 200 mm, in particular from 100 mm to 200 mm, more particularly from 120 mm to 130 mm, FIG. 7 represents by way of example how such a turbine blade 120, 130 is produced.

It is known from the prior art to set up a temperature gradient along the longitudinal axis 13 by using heaters 4, the turbine blade extending for example from the blade tip to the blade root 400 so that the lowest temperature is imposed on the blade tip 415 and the component 1 is drawn through a temperature gradient 7.

The effect achieved by additional heaters on one side, where the wide longitudinal grain 11' is intended to be formed, is that the first longitudinal grain 11' is formed wider on the edge 13, 409.

One or more seeding agents may also be used in order to adjust the width of the longitudinal grain 11' expediently.

FIG. 8 shows a gas turbine 100 by way of example in a partial longitudinal section.

The gas turbine 100 internally comprises a rotor 103, which will also be referred to as the turbine rotor, mounted so as to rotate about a rotation axis 102 and having a shaft 101.

Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine blade 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the end of the compressor 105 on the turbine side is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are single-crystal (SX structure) or have only longitudinally directed grains (DS structure).

Iron-, nickel- or cobalt-based superalloys are for example used as the material for the components, in particular for the turbine blades 120, 130 and components of the combustion chamber 110.

Such superalloys are known for example from EP 1 204 776 B1, EP 1 306 454, EP 1 319 729 A1, WO 99/67435 or WO 00/44949; with respect to the chemical composition of the alloys, these documents are part of the disclosure.

The guide vanes 130 have a guide vane root (not shown here) facing the inner housing 138 of the turbine 108, and a guide vane head lying opposite the guide vane root. The guide vane head faces the rotor 103 and is fixed on a fastening ring 140 of the stator 143.

FIG. 9 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

Successively along the longitudinal axis 121, the blade 120, 130 comprises a fastening zone 400, a blade platform 403 adjacent thereto as well as a blade surface 406 and a blade tip 415.

As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a fir tree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130.

Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The blade 120, 130 may in this case be manufactured by a casting method, also by means of directional solidification, by a forging method, by a machining method or combinations thereof.

Workpieces with a single-crystal structure or structures are used as components for machines which are exposed to heavy mechanical, thermal and/or chemical loads during operation.

Such single-crystal workpieces are manufactured, for example, by directional solidification from the melt. These are casting methods in which the liquid metal alloy is solidified to form a single-crystal structure, i.e. to form the single-crystal workpiece, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a single-crystal structure, i.e. the entire workpiece consists of a single crystal. It is necessary to avoid the transition to globulitic (polycrystalline) solidification in these methods, since non-directional growth will necessarily form transverse and longitudinal grain boundaries which negate the beneficial properties of the directionally solidified or single-crystal component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; with respect to the solidification method, these documents are part of the disclosure.

The blades 120, 130 may likewise have coatings against corrosion or oxidation, for example (MCrAlX; M is at least one element from the group iron (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

The density is preferably 95% of the theoretical density.

A protective aluminum oxide layer (TGO=thermally grown oxide layer) is formed on the MCrAlX layer (as an interlayer or as the outermost layer).

The layer composition preferably comprises Co-30Ni-28Cr-8Al-0.6Y-0.7Si or Co-28Ni-24Cr-10Al-0.6Y. Besides these cobalt-based protective coatings, it is also preferable to use nickel-based protective layers such as Ni-10Cr-12Al-0.6Y-3Re or Ni-12Co-21Cr-11Al-0.4Y-2Re or Ni-25Co-17Cr-10Al-0.4Y-1.5Re.

On the MCrAlX, there may furthermore be a thermal barrier layer, which is preferably the outermost layer and consists for example of $ZrO_2$, i.e. it is not stabilized or is partially or fully stabilized by yttrium oxide and/or calcium oxide and/or magnesium oxide.

The thermal barrier layer covers the entire MCrAlX layer.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise produces porous, micro- or macro-cracked grains for better thermal shock resistance. The thermal barrier layer is thus preferably more porous than the MCrAlX layer.

The blade 120, 130 may be designed to be hollow or solid.

If the blade 120, 130 is intended to be cooled, it will be hollow and optionally also comprise film cooling holes 418 (indicated by dashes).

FIG. 10 shows a combustion chamber 110 of the gas turbine 100.

The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Owing to the high temperatures inside the combustion chamber 110, a cooling system may also be provided for the heat shield elements 155 or for their retaining elements. The heat shield elements 155 are then hollow, for example, and optionally also have film cooling holes (not shown) opening into the combustion chamber space 154.

Each heat shield element 155 made of an alloy is equipped with a particularly heat-resistant protective layer (MCrAlX layer and/or ceramic coating) on the working medium side, or is made of refractory material (solid ceramic blocks).

These protective layers may be similar to the turbine blades, i.e. for example MCrAlX means: M is at least one element from the group iron (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX, there may furthermore be an e.g. ceramic thermal barrier layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise porous, micro- or macro-cracked grains for better thermal shock resistance.

Refurbishment means that turbine blades 120, 130 or heat shield elements 155 may need to be stripped of protective layers (for example by sandblasting) after their use. The corrosion and/or oxidation layers or products are then removed. Optionally, cracks in the turbine blade 120, 130 or heat shield element 155 are also repaired. The turbine blades 120, 130 or heat shield elements 155 are then recoated and the turbine blades 120, 130 or heat shield elements 155 are used again.

The invention claimed is:

1. A turbine blade having an airfoil with a leading edge and a trailing edge wherein the leading edge is exposed first to a medium flow before the trailing edge, the turbine blade, comprising:
    a longitudinal axis;
    a plurality of longitudinal grains directionally solidified in a rod-crystalline form forming the whole airfoil and along the longitudinal axis, each longitudinal grain comprising a grain width running transverse to the longitudinal axis; and
    a width of the airfoil,
    wherein a first grain width of a first longitudinal grain located on the leading edge of the airfoil that is at least 20% of the width of the airfoil.

2. The turbine blade as claimed in claim 1, wherein the airfoil has at least three longitudinal grains.

3. The turbine blade as claimed in claim 1, wherein the first longitudinal grain has the first grain width of 5 mm to 60 mm perpendicular to the longitudinal axis.

4. The turbine blade as claimed in claim 1, wherein the airfoil has a width of 70 mm to 300 mm, perpendicular to the longitudinal axis.

5. The turbine blade as claimed in claim 1, further comprising a length whereby the airfoil has a length/width ratio of >3.

6. The turbine blade as claimed in claim 2, further comprising a thickness, whereby the airfoil has a length/thickness ratio of >5.

7. The turbine blade as claimed in claim 1,
    wherein a medium flows in a flow direction at an angle not equal to 0°,
    wherein the medium flows perpendicular to the longitudinal axis, and
    wherein the first longitudinal grain which is widest or has a largest cross section receives a medium flow first.

8. The turbine blade as claimed in claim 1, wherein the airfoil has a width/thickness ratio of >2.

9. The turbine blade as claimed in claim 1, wherein the airfoil has at most 60 longitudinal grains.

10. The turbine blade as claimed in claim 1, wherein the first longitudinal grain has a minimum grain width of 5 mm.

11. The turbine blade as claimed in claim 1, wherein the airfoil is a cast part, more than 90% of which consists of a plurality of longitudinal grains.

12. The turbine blade as claimed in claim 1, wherein the first grain width is at most 50% of the width.

13. The turbine blade as claimed in claim 1, wherein the airfoil is a turbine blade having a blade portion including the leading edge and trailing edge.

14. A turbine blade having an airfoil with a leading edge and a trailing edge wherein the leading edge is exposed first to a medium flow before the trailing edge, the turbine blade, comprising:
- a longitudinal axis;
- a plurality of longitudinal grains directionally solidified in a rod-crystalline foul forming the whole airfoil and along the longitudinal axis, each longitudinal grain comprising a grain width running transverse to the longitudinal axis, and
- wherein the plurality of longitudinal grains each having a grain width, and
- wherein a first longitudinal grain located on the leading edge of the airfoil has a maximum grain width that is larger than a grain width of each of the other longitudinal grain widths.

15. The turbine blade as claimed in claim 14, wherein the grain width of the first longitudinal grain is at least 20% of a width of the airfoil.

16. The turbine blade as claimed in claim 14, wherein the airfoil has at least three longitudinal grains.

17. The turbine blade as claimed in claim 14, wherein the first longitudinal grain has the grain width of 5 mm to 60 mm perpendicular to the longitudinal axis.

18. The turbine blade as claimed in claim 14, wherein the airfoil has the width of 70 mm to 300 mm, perpendicular to the longitudinal axis.

19. A turbine blade having an airfoil with a leading edge and a trailing edge wherein the leading edge is exposed first to a medium flow before the trailing edge, the turbine blade, comprising:
- a longitudinal axis; and
- a plurality of longitudinal grains directionally solidified in a rod-crystalline fowl on the whole airfoil along the longitudinal axis, each longitudinal grain comprising a grain width running transverse to the longitudinal axis,
- wherein a first longitudinal grain located on the leading edge of the airfoil has a first grain width of at least 5 mm.

20. The turbine blade as claimed in claim 19, wherein the first grain width is at least 20% of a width of the airfoil.

* * * * *